United States Patent
Chen et al.

(10) Patent No.: US 8,108,704 B2
(45) Date of Patent: Jan. 31, 2012

(54) METHOD FOR AUTOMATICALLY SWITCHING POWER STATES

(75) Inventors: Po-Huan Chen, Taipei (TW); Hsin-Yi Li, Taipei (TW); Tsung-Ping Liu, Taipei (TW); Po-Wei Chou, Taipei (TW)

(73) Assignee: ASUSTeK Computer Inc., Taipei (TW)

( * ) Notice: Subject to any disclaimer, the term of this patent is extended or adjusted under 35 U.S.C. 154(b) by 635 days.

(21) Appl. No.: 12/233,609

(22) Filed: Sep. 19, 2008

(65) Prior Publication Data

US 2009/0138738 A1    May 28, 2009

(30) Foreign Application Priority Data

Nov. 23, 2007  (TW) ................................ 96144418 A

(51) Int. Cl.
*G06F 1/00* (2006.01)

(52) U.S. Cl. .......................................... 713/323; 710/18

(58) Field of Classification Search .................... 710/18; 713/300–320, 323–330
See application file for complete search history.

(56) References Cited

U.S. PATENT DOCUMENTS

| | | | |
|---|---|---|---|
| 4,698,748 A * | 10/1987 | Juzswik et al. | 713/322 |
| 2005/0215274 A1 | 9/2005 | Matson et al. | |
| 2009/0077394 A1 * | 3/2009 | Tsai et al. | 713/310 |

FOREIGN PATENT DOCUMENTS

| | | |
|---|---|---|
| CN | 1233826 | 11/1999 |
| CN | 1520215 | 8/2004 |
| TW | 200500947 | 1/2005 |

OTHER PUBLICATIONS

"1st Office Action of China counterpart application", issued on Apr. 13, 2010, p. 1-p. 7.
"Office Action of Taiwan Counterpart Application", issued on Apr. 15, 2011, p. 1-p. 7, in which the listed reference was cited.

* cited by examiner

*Primary Examiner* — Clifford Knoll
(74) *Attorney, Agent, or Firm* — Jianq Chyun IP Office

(57) ABSTRACT

A method for automatically switching power states is disclosed. According to the method, when an electronic apparatus is in a power-saving state and a waking up time is reached, the electronic apparatus is switched into a working state, and when an executing time is reached, the electronic apparatus automatically executes an assigned function. After completing the assigned function, the electronic apparatus is switched back into the power-saving state for energy-saving purpose.

14 Claims, 4 Drawing Sheets

METHOD FOR AUTOMATICALLY SWITCHING POWER STATES

CROSS-REFERENCE TO RELATED APPLICATION

This application claims the priority benefit of Taiwan application serial no. 96144418, filed on Nov. 23, 2007. The entirety of the above-mentioned patent application is hereby incorporated by reference herein and made a part of this specification.

BACKGROUND OF THE INVENTION

1. Field of the Invention

The present invention generally relates to a method for switching power states, and more particularly, to a method for automatically switching power states ahead of and after executing an assigned function.

2. Description of Related Art

The power management is considered as an important function of a general desktop computer and a portable electronic equipment powered by batteries (for example, notebook). At the present time with rising environmental and energy consciousness, people may want to make a contribution for environmental protection though the proper power management while taking enjoyments in conveniences brought by computers. That is to say, whenever a computer is in vacancy state, the computer is forced into a shutdown state, a hibernate state or a standby state so as to save energy and meanwhile to reduce exhaust heat.

The power management with a computer system nowadays mostly complies with advanced configuration and power interface standard (ACPI standard). According to ACPI standard, the power states include six states of S0-S5, wherein S0 state is just the so-called working state, and the rest S1-S5 states respectively represent different extents of the power-saving state by a power supply.

In general, whenever a computer system enters a power-saving state, the computer does not run a program anymore; in case a user specifies a computer system to execute an assigned function at a preset time, the computer must be kept in the S0 state all the time, which not only consumes power, but also shortens the computer life and affects the stability thereof on a long term view. On the other hand, even if a computer system is automatically switched on from a power-saving state at a preset time to execute an assigned function by means of configured circuit hardware plus program software, the computer still fails to automatically go back into the previous power-saving state.

For example, if a user takes a foreign tour for a week and the computer is scheduled to be automatically turned on in the evening on the third day to record a TV program for an hour, but the computer may fail to be restored into the previous power state after the TV program is recorded. As a result, the computer has to be in the switching-on state for the following four days without executing any program, which not only consumes power, but also shortens the computer life.

SUMMARY OF THE INVENTION

Accordingly, the present invention is directed to a method for automatically switching power states, by which an electronic apparatus in power-saving state is able to be switched into a working state ahead of executing an assigned function and switched back into the power-saving state after executing the assigned function.

The present invention provides a method for automatically switching power states, which is suitable for an electronic apparatus with a power-saving state and a working state. First, when the electronic apparatus is in the power-saving state, it is detected whether or not a waking up time is reached. Next, when the waking up time is reached, the electronic apparatus is switched into the working state so as to automatically execute an assigned function at a preset executing time, wherein the waking up time is ahead of the executing time. Then, after completing the assigned function, the electronic apparatus is switched back into the power-saving state.

In an embodiment of the present invention, the above-mentioned step of switching the electronic apparatus into the working state includes waking up the electronic apparatus into the working state by using a waking-up signal triggered by a timing mechanism.

In an embodiment of the present invention, before the waking up time is reached, the above-mentioned method further includes detecting whether or not an input signal triggered by the user is received, so that if the input signal is received, the electronic apparatus is switched into the working state, the electronic apparatus automatically executes the assigned function at the executing time and the electronic apparatus is kept in the working state after completing the assigned function.

In an embodiment of the present invention, after completing the assigned function, the above-mentioned method further includes detecting whether or not an input signal triggered by a user is received within a waiting duration. If the input signal is not received, the electronic apparatus is switched into the power-saving state; if the input signal is received, the electronic apparatus is kept in the working state.

In an embodiment of the present invention, the above-mentioned power-saving state is a standby state, a hibernate state or a soft off state.

The present invention provides a method for automatically switching power states, which is suitable for an electronic apparatus with a first power-saving state, a second power-saving state and a working state. First, when the electronic apparatus is in the first power-saving state, it is detected whether or not a first waking up time is reached. Next, when the first waking up time is reached, the electronic apparatus is switched into the working state. Then, when a first waiting time is reached, the electronic apparatus is switched into the second power-saving state, wherein more energy is saved in the first power-saving state than that in the second power-saving state. After that, when a second waking up time is reached, the electronic apparatus is switched into the working state again, so that the electronic apparatus automatically executes an assigned function at an executing time. The first waking up time, the first waiting time, the second waking up time and the executing time herein are sequentially created. Further, after completing the assigned function, the electronic apparatus is switched into the first power-saving state.

In an embodiment of the present invention, the above-mentioned step of switching the electronic apparatus into the working state includes switching the electronic apparatus into the working state by using a waking-up signal triggered by a timing mechanism.

In an embodiment of the present invention, before the first waking up time is reached, the above-mentioned method further includes: detecting whether or not an input signal triggered by a user is received; if the input signal is received, switching the electronic apparatus into the working state so that the electronic apparatus automatically executes the assigned function at the executing time; and keeping the electronic apparatus in the working state after completing the assigned function.

In an embodiment of the present invention, within a duration from the first waking up time to the first waiting time, the above-mentioned method further includes: detecting whether or not an input signal triggered by a user is received so that after receiving the input signal, the electronic apparatus automatically executes the assigned function at the executing time; and keeping the electronic apparatus in the working state after completing the assigned function.

In an embodiment of the present invention, the above-mentioned within a duration from the first waiting time to the second waking up time, the above-mentioned method further includes: detecting whether or not an input signal triggered by a user is received; once receiving the input signal, switching the electronic apparatus into the working state immediately so that the electronic apparatus automatically executes the assigned function at the executing time; and keeping the electronic apparatus in the working state after completing the assigned function.

In an embodiment of the present invention, after completing the assigned function, the above-mentioned method further includes: detecting whether or not the input signal triggered by a user is received within a duration from the second waking up time to a second waiting time after completing the assigned function; if the input signal is not received, switching the electronic apparatus into the first power-saving state; otherwise, keeping the electronic apparatus in the working state.

In an embodiment of the present invention, the above-mentioned first power-saving state is a hibernate state or a soft off state, and the second power-saving state is a standby state. In addition, the above-mentioned assigned function is, for example, a video-recording function.

The present invention uses an automatic startup function to wake up the electronic apparatus in the power-saving state into the working state at a specified time, so that the electronic apparatus is ready to execute an assigned function and the electronic apparatus is switched back into the power-saving state after completing the assigned function, which results in operation convenience and saving energy.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
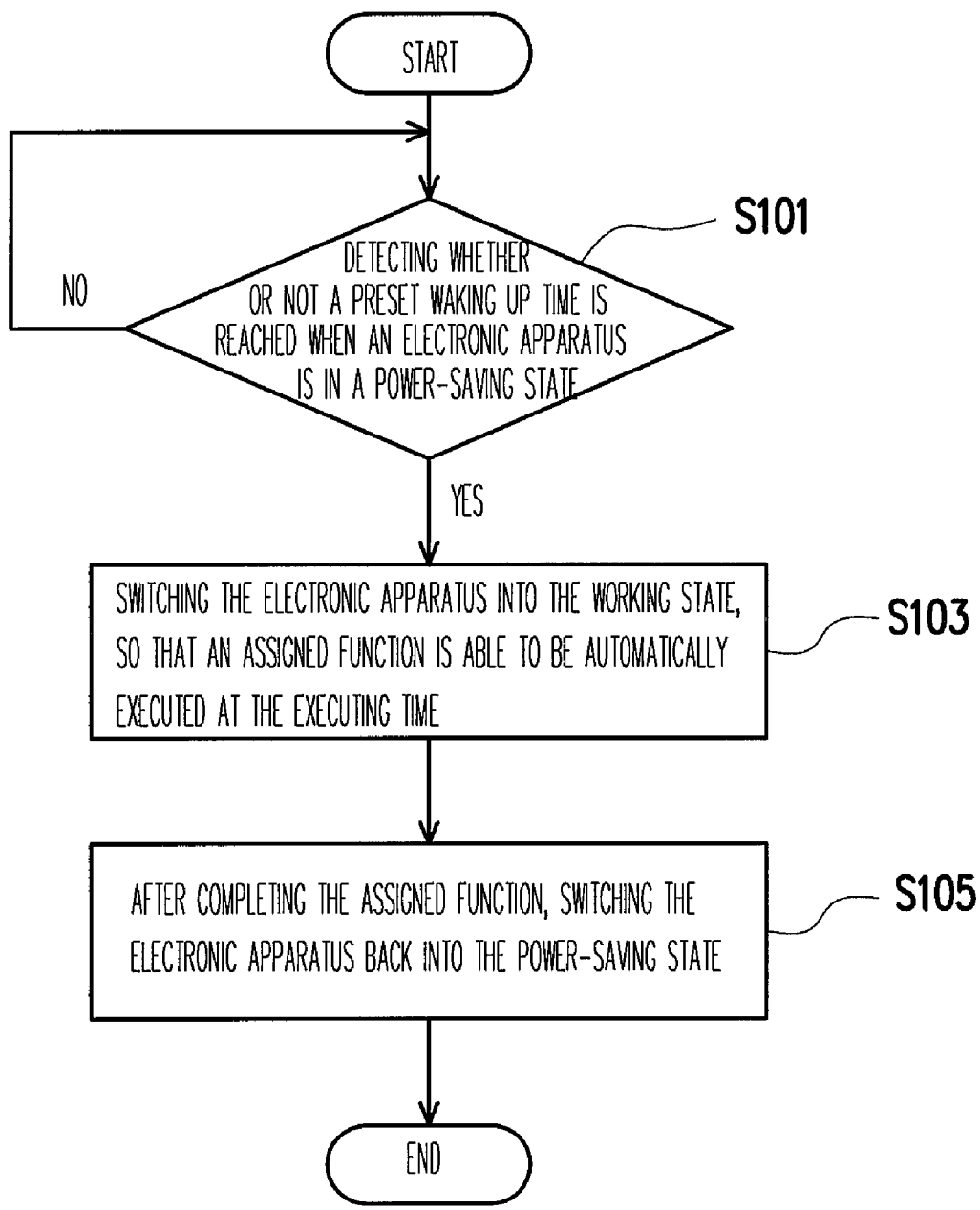
FIG. 1 is a flowchart showing a method for automatically switching power states according to the first embodiment of the present invention.

Reference will now be made in detail to the present preferred embodiments of the invention, examples of which are illustrated in the accompanying drawings. Wherever possible, the same reference numbers are used in the drawings and the description to refer to the same or like parts.

In the following embodiments, an electronic apparatus has, for example, a timer and an automatic executing mechanism (for example, a prerecord mechanism of a video cassette recorder), wherein the timer is used as a clock to time present time, and the automatic executing mechanism is used to automatically execute an assigned function at a preset executing time. In more detail, for example, an electronic apparatus has a real time clock (RTC), i.e., a timer, so that the electronic apparatus running in a power-saving state can be waked up when the timer reaches a waking up time, where a waking up command is executed and sent to a power supply for the purpose of waking up the electronic apparatus.

In the following embodiments, the power-saving state can be categorized into several states according to the extent of power supplying: standby state, hibernate state and soft off state. The standby state herein is, for example, suspend-to-CPU state or suspend-to-RAM state (STR state); the hibernate state is, for example, suspend-to-disk state (STD state); the soft off state represents a state where only a little bit electric power is provided to peripheral devices with a waking-up function, for example, a web card or a keyboard.

In addition, anyone skilled in the art can implement the following embodiments by using a computer program in association with an access media for storing the program to realize the method for automatically switching power states, which the present invention does not limit. The preferred embodiments of the present invention are explained hereinafter.

The First Embodiment

FIG. 1 is a flowchart showing a method for automatically switching power states according to the first embodiment of the present invention. Referring to FIG. 1, first in step S101, a system detects whether or not a preset waking up time is reached when an electronic apparatus is in a power-saving state, wherein the waking up time is arranged ahead of an executing time. If the waking up time is not reached yet, the electronic apparatus is kept in the power-saving state, so that when the waking up time is reached later, the system enters step S103 to wake up the electronic apparatus into a working state, wherein, for example, the executing time is preset at 14:00 with the timer and the waking up time is preset at 13:50.

Next, when the waking up time is reached, the system enters step S103 and the electronic apparatus is switched into the working state, so that an assigned function, for example, a prerecord mechanism of a video cassette recorder, is able to be automatically executed at the executing time. If the waking up time is 13:50 and the timer reaches 13:50, the timer would trigger a waking up signal sent to the power supply, so that the power supply starts to provide all the components of the electronic apparatus with power and the electronic apparatus is switched into the working state.

Then, after completing the assigned function, the system enters step S105 and the electronic apparatus is switched back into the power-saving state for energy-saving purpose. For example, after completing the assigned function, the automatic executing mechanism sends a power-saving notice message to the power supply so as to temporarily stop supplying power to some components.

In terms of a video cassette recorder with a prerecord mechanism, a user can, for example, preset the executing time of the prerecord function at 14:00 and the recording duration as one hour, and specify the video cassette recorder is waked up from the power-saving state ahead of the executing time by five minutes, i.e., the waking up time is 13:55 (the above-mentioned parameters can be preset in the electronic apparatus as well). When the video cassette recorder is in the power-saving state and the timer reaches 13:55, the video cassette recorder is waked up (switched) into the working state; when the timer reaches 14:00, the video-recording function is automatically executed according to the prerecord function; after one hour to complete the recording task, the video cassette recorder is restored into the previous power-saving state based on the prerecord function.

In the application practice, the power-saving state of the embodiment has, for example, five states (S1-S5 states) according to ACPI standard, while the working state is, for example, S0 state. The method for automatically switching power states complying with ACPI standard is explained in more detail hereinafter.

Figure 2:
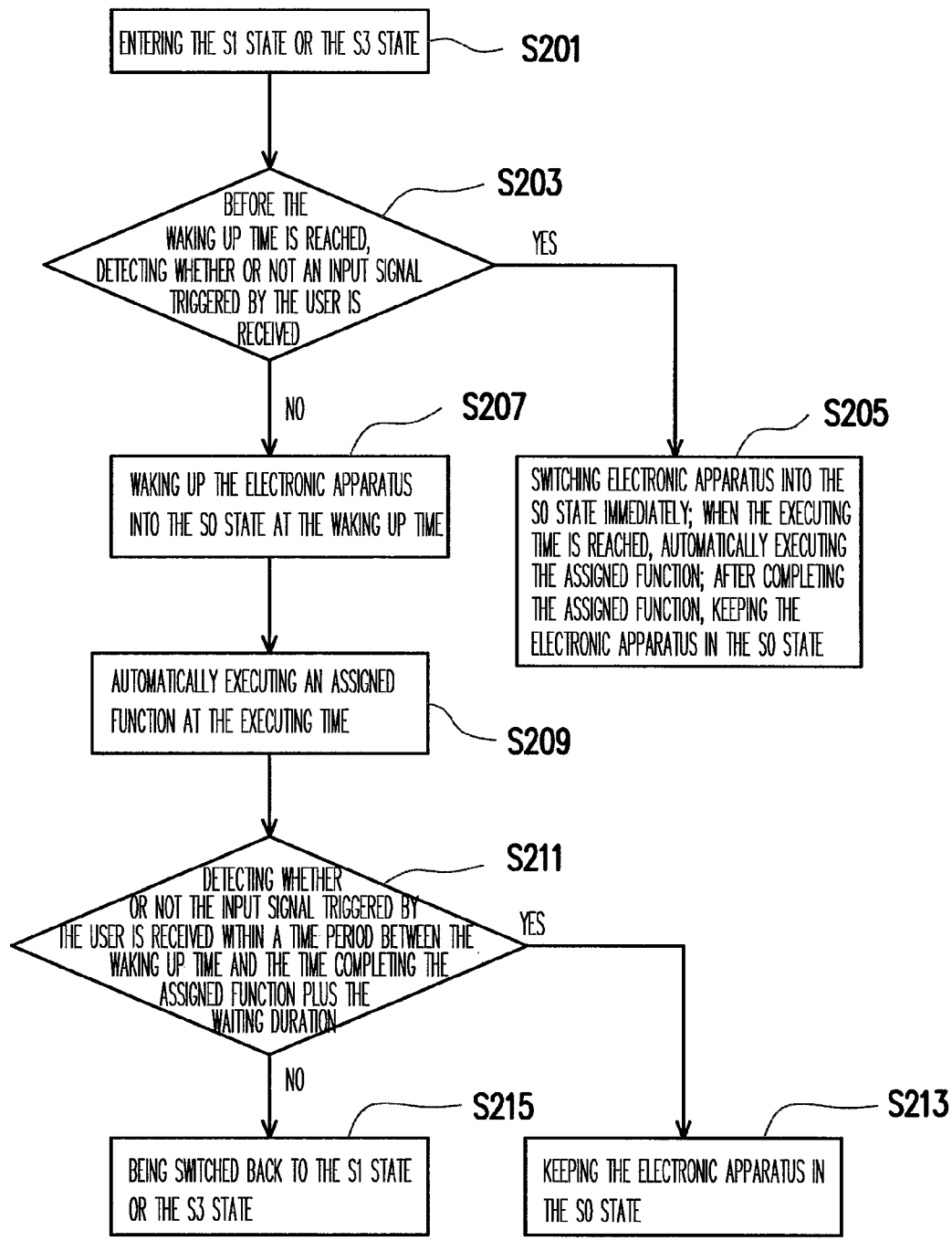
FIG. 2 is a flowchart showing a method for automatically switching power states supporting the ACPI standard according to the first embodiment of the present invention.

FIG. 2 is a flowchart showing a method for automatically switching power states supporting the ACPI standard according to the first embodiment of the present invention. Referring to FIG. 2, in the embodiment, it is assumed that the BIOS (basic input output system) of the electronic apparatus supports the S1 state and the S3 state. First in step S201, the electronic apparatus enters the S1 state or the S3 state for energy-saving purpose, wherein the electronic apparatus enters the power-saving state through selecting the S1 state or the S3 state by the user.

Next in step S203, before the timer reaches the waking up time, the system detects whether or not an input signal triggered by the user is received. The input signal is, for example, a power startup signal triggered by the user through pressing down the button of power supply. If the input signal is received, the system enters step S205, where the electronic apparatus is switched into the S0 state immediately; when the timer reaches the executing time, the assigned function is automatically executed through the automatic executing mechanism; after completing the assigned function, the electronic apparatus is kept in the S0 state. If the input signal is not received yet, the system enters step S207, where the electronic apparatus is waked up into the S0 state at the waking up time. After the electronic apparatus is waked up into the S0 state, when the timer reaches the executing time, as shown by step S209, the system automatically executes the assigned function.

In an application practice, for example, the waking up time is preset at 13:55. When an electronic apparatus enters the power-saving state according to a configuration by a user, and if the user presses down a power button at 13:00, the electronic apparatus immediately enters the S0 state without waiting until 13:55 to wake up the apparatus. At the time, since the electronic apparatus has been waked up by the user already to indicate that the user may require to operate the electronic apparatus, therefore, the electronic apparatus is kept in the S0 state. After the electronic apparatus is waked up into the S0 state, when the timer reaches the executing time, the preset assigned function can be automatically executed. In addition, ahead of 13:55, if the input signal is not received by the electronic apparatus yet, the electronic apparatus would be waked up into the S0 state at 13:55.

After completing the assigned function, as shown by step S211, within a waiting duration (for example, two minutes) following completing the assigned function, it is detected whether or not the input signal triggered by the user is received within a time period between the waking up time and the time completing the assigned function plus the waiting duration, wherein the input signal is sent by an input/output device, for example, a mouse or a keyboard. If the input signal is received, it means the user wants to use the electronic apparatus at the time, and the system enters step S213 where the electronic apparatus is kept in the S0 state; otherwise, the system enters step S215 where the electronic apparatus is switched into the S1 state or S3 state.

For example, in terms of video-recording function, when the task of recording video is completed and if the user manipulates the keyboard or the mouse within a time period between the waking up time and the time completing the video-recording function plus the waiting duration, it indicates that the user may will use the electronic apparatus, so that the electronic apparatus must be kept in the S0 state. If the input signal is not received yet beyond the above-mentioned waiting duration of two minutes, the electronic apparatus is switched into the previous S1 state or S3 state. To implement the above-mentioned scheme, a control program or a detection module comprising hardware and the timer, and a register are used for the purposes of detecting, executing the video-recording function and restoring the electronic apparatus back to the previous power-saving state, wherein the register is used to store a code representing the previous power-saving state.

Note that in different power-saving states, due to different power-supplying extents, the required time length for waking up the electronic apparatus is different; therefore, when the power-saving state is a hibernate state (S4 state) or a soft off state (S5 state), it is preferred that waking up the electronic apparatus into the working state (S0 state) first, following by switching the electronic apparatus into a standby state (S1 state or S3 state) to save energy, wherein the standby state can be waked up more quickly. In the following, another embodiment of the method for automatically switching power states is described, where the electronic apparatus is originally in a power-saving state with less energy consumption.

The Second Embodiment

Figure 3:
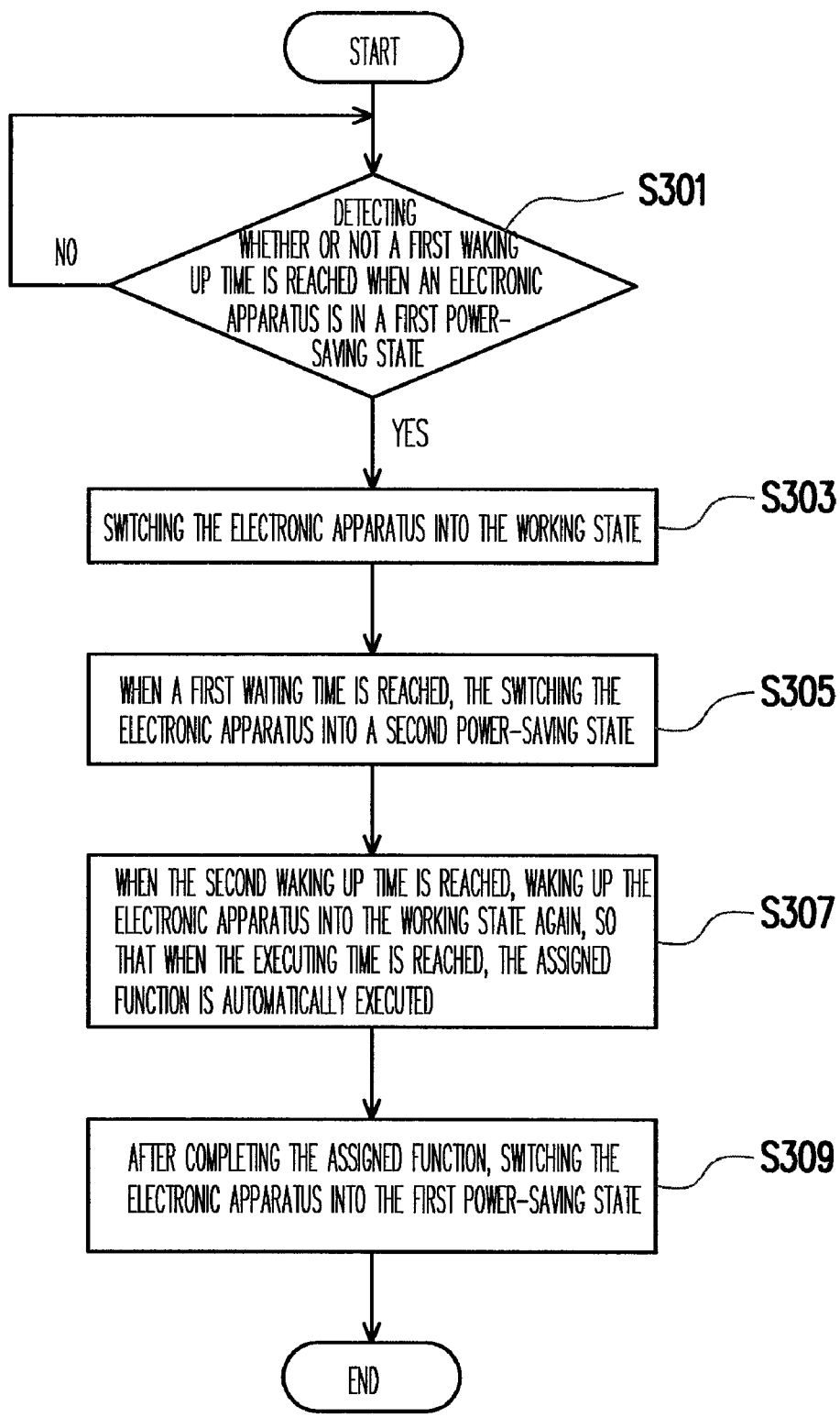
FIG. 3 is a flowchart showing a method for automatically switching power states according to the second embodiment of the present invention.

FIG. 3 is a flowchart showing a method for automatically switching power states according to the second embodiment of the present invention. Referring to FIG. 3, first in step S301, a system detects whether or not a first waking up time is reached with an electronic apparatus in a first power-saving state, wherein the first waking up time is arranged ahead of an executing time. If the first waking up time is not reached yet, the electronic apparatus is kept in the first power-saving state, so that when the first waking up time is reached later, the system enters step S303, wherein the first power-saving state consumes less electric energy and requires a longer time to be switched into the working state, and the first power-saving state is, for example, a hibernate state or a soft off state.

Next, when the first waking up time is reached, the system enters step S303 and the electronic apparatus is switched into the working state. Since after the electronic apparatus is switched into the working state, there may be a duration left until the executing time; thus, for energy-saving purpose in step S305, when a first waiting time is reached, the electronic apparatus is switched into a second power-saving state (for example, standby state) for durably energy-saving purpose, meanwhile, the electronic apparatus is ready to quickly enter the working state.

Further in step S307, when the second waking up time is reached, the system wakes up the electronic apparatus into the working state again, so that when the executing time is reached, the assigned function is automatically executed. The above-mentioned second waking up time is arranged between the executing time and the first waking up time. For example, the executing time is 14:00, the first waking up time is 13:50 and the second waking up time is 13:55.

Further in step S309, after completing the assigned function, the system switches the electronic apparatus into the first power-saving state for energy-saving purpose.

In the application practice, according to ACPI standard, the working state is, for example, S0 state, the first power-saving state is, for example, S4 state or S5 state, and the second power-saving state is, for example, S1 state or S3 state. In the following, the method for automatically switching power states of the present invention in association with the ACPI standard is exemplarily explained in more detail.

Figure 4:
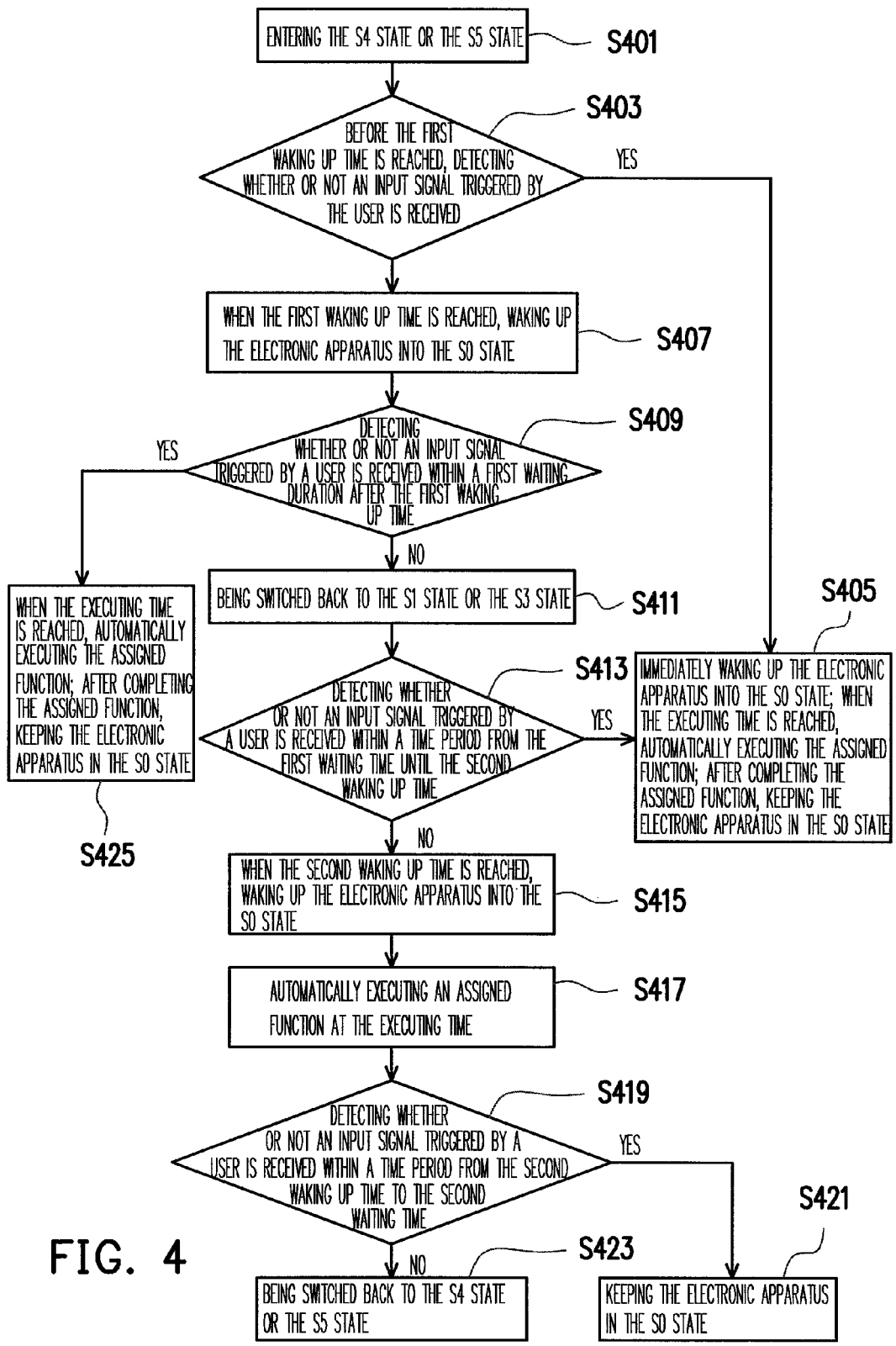
FIG. 4 is a flowchart showing a method for automatically switching power states supporting the ACPI standard according to the second embodiment of the present invention.

FIG. 4 is a flowchart showing a method for automatically switching power states supporting the ACPI standard according to the second embodiment of the present invention. Referring to FIG. 4, in the embodiment, it is assumed that the BIOS of the electronic apparatus supports the S1 state and the S3 state. First in step S401, the electronic apparatus enters the S4 state or the S5 state for energy-saving purpose.

Next in step S403, before the timer reaches the first waking up time, the system detects whether or not an input signal triggered by the user is received. The input signal is, for example, a power startup signal triggered by the user through pressing down the button of power supply. If the input signal is received, the system enters step S405, where the electronic apparatus is switched into the S0 state immediately; when the timer reaches the executing time, the assigned function is automatically executed; after completing the assigned function, the electronic apparatus is kept in the S0 state.

If the input signal is not received in step S403, the system enters step S407, where when the first waking up time is reached, the electronic apparatus is waked up into the S0 state.

Further in step S409, it is detected whether or not an input signal (for example, the signal sent by a mouse or a keyboard) triggered by a user is received within a duration form the first waking up time to the first waiting time (the duration is, for example, 30 seconds). That is to say, it is detected whether or not an input signal triggered by a user is received within 30 seconds after the first waiting up time. If the input signal is received the system enters step S425 and when the executing time is reached, the assigned function is automatically executed through the automatic executing mechanism; after completing the assigned function, the electronic apparatus is kept in the S0 state.

If the input signal triggered by a user is not received yet in step S409, the system enters step S411, where the electronic apparatus is switched into the S1 state or S3 state, wherein the S1 state or the S3 state is preset by the system or is selected by the user, which the present invention does not limit.

Further in step S413, the system has a same or similar operation as step S403. In step S413, within a time period from the first waiting time until the second waking up time, the system still detects whether or not an input signal triggered by a user is received. If the input signal is received, the system goes to step S405; otherwise, the system goes to step S415, where when the second waking up time is reached, the electronic apparatus is waked up into the S0 state.

Since the time for the electronic apparatus to be waked up into the S1 state from the S4 state or S5 state is longer required; therefore, the electronic apparatus must be waked up into the S0 state ahead of the executing time and then be switched into the S1 state or the S3 state, wherein the S1 state and the S3 state belong to a standby state and can be quickly waked up. When the executing time is approached, the electronic apparatus can be waked up into the S0 state quickly.

Further in step S417, when the executing time is reached, the assigned function is automatically executed through the automatic executing mechanism; after completing the assigned function, the system enters step S419, where it is detected whether or not an input signal triggered by a user is received within a time period from the second waking up time to the second waiting time, wherein the input signal is, for example, the signal sent by a mouse or a keyboard. If the input signal is received, it means the user want to use the electronic apparatus at the time and the system goes to step S421 to keep the electronic apparatus in the S0 state; otherwise, the system goes to step S423 to switch the electronic apparatus into the S4 state or S5 state.

Taking "electronic program schedule" based on media center edition (MCE) as an example, a user can make a schedule for recording TV programs in advance, where the computer system, for example, is preset to automatically record TV programs every day between 14:00 to 16:00. It is assumed herein that when the computer system in the S4 state, the default first waking up time is ahead of the executing time by 10 minutes and the default second waking up time is ahead of the executing time by 5 minutes.

According to the above-mentioned schedule, at the time ahead of 14:00 by 10 minutes (i.e., at 13:50), the computer is automatically turned on to enter the S0 state. After turning on the computer, the system enters S3 state immediately for energy-saving purpose. Then, at the time ahead of the executing time by 5 minutes (i.e., at 13:55), the system is waked up into the S0 state from the S3 state to wait for recording video. After that at 14:00, the system automatically implements the video-recording task. After completing the recording task at 16:00, the computer system is automatically switched back into the previous power state (S4 state) at 16:02.

In the above described process, if the user presses down a power button, a keyboard, a remote button, a mouse button or moves a mouse, the computer would automatically conclude by judgment that the user wants to operate the computer and the system is thereby kept in the S0 state. Certainly, the computer would automatically implement a video-recording task at 14:00.

In summary, it can be seen from the above described embodiments that when an electronic apparatus is in vacancy, the system enters a power-saving state. Before to execute an assigned function, the electronic apparatus is waked up to automatically execute the assigned function, and after completing the assigned function the system is switched back into the power-saving state, which is advantageous in saving energy and increasing the system life.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method for automatically switching power states, suitable for an electronic apparatus with a power-saving state and a working state; the method comprising:
  when the electronic apparatus is in the power-saving state, detecting whether or not a waking up time is reached;
  when the waking up time is reached, switching the electronic apparatus into the working state so as to automatically execute an assigned function at a preset executing time, wherein the waking up time is ahead of the executing time; and after completing the assigned function, switching back the electronic apparatus into the power-saving state.

2. The method for automatically switching power states according to claim 1, wherein the step of switching the electronic apparatus into the working state comprises:
  switching the electronic apparatus into the working state by using a waking-up signal triggered by a timing mechanism.

3. The method for automatically switching power states according to claim 1, wherein before the waking up time is reached, the method further comprises:
  detecting whether or not an input signal triggered by a user is received; and
  if the input signal is received, switching the electronic apparatus into the working state so that the electronic apparatus automatically executes the assigned function at the executing time, and keeping the electronic apparatus in the working state after completing the assigned function.

4. The method for automatically switching power states according to claim 1, wherein after completing the assigned function, the method further comprises:
  detecting whether or not an input signal triggered by a user is received within a time period from the waking up time to the time of completing the assigned function plus a waiting duration;
  if the input signal is not received, switching the electronic apparatus into the power-saving state; and
  if the input signal is received, keeping the electronic apparatus in the working state.

5. The method for automatically switching power states according to claim 1, wherein the assigned function is a video-recording function.

6. The method for automatically switching power states according to claim 1, wherein the power-saving state is one of a standby state, a hibernate state and a soft off state.

7. A method for automatically switching power states, suitable for an electronic apparatus with a first power-saving state, a second power-saving state and a working state; the method comprising:
  when the electronic apparatus is in the first power-saving state, detecting whether or not a first waking up time is reached;
  when the first waking up time is reached, switching the electronic apparatus into the working state;
  when a first waiting time is reached, switching the electronic apparatus into the second power-saving state, wherein the electronic apparatus saves more energy in the first power-saving state than that in the second power-saving state;
  when a second waking up time is reached, switching the electronic apparatus into the working state, so that the electronic apparatus automatically executes an assigned function at an executing time, wherein the first waking up time, the first waiting time, the second waking up time and the executing time are sequentially created; and
  after completing the assigned function, switching the electronic apparatus into the first power-saving state.

8. The method for automatically switching power states according to claim 7, wherein the step of switching the electronic apparatus into the working state comprises:
  switching the electronic apparatus into the working state by using a waking-up signal triggered by a timing mechanism.

9. The method for automatically switching power states according to claim 7, wherein before the first waking up time is reached, the method further comprises:
  detecting whether or not an input signal triggered by a user is received; and
  if the input signal is received, switching the electronic apparatus into the working state, so that the electronic apparatus automatically executes the assigned function at the executing time, and keeping the electronic apparatus in the working state after completing the assigned function.

10. The method for automatically switching power states according to claim 7, wherein within a duration from the first waking up time to the first waiting time, the method further comprises:
  detecting whether or not an input signal triggered by a user is received; and
  if the input signal is received, automatically executing the assigned function at the executing time, and keeping the electronic apparatus in the working state after completing the assigned function.

11. The method for automatically switching power states according to claim 7, wherein within a duration from the first waiting time to the second waking up time, the method further comprises:
  detecting whether or not an input signal triggered by a user is received; and
  if the input signal is received, switching the electronic apparatus into the working state immediately, automatically executing the assigned function at the executing time, and keeping the electronic apparatus in the working state after completing the assigned function.

12. The method for automatically switching power states according to claim 7, wherein after completing the assigned function, the method further comprises:
  detecting whether or not an input signal triggered by a user is received within a duration from the second waking up time to a second waiting time after completing the assigned function;
  if the input signal is not received, switching the electronic apparatus into the first power-saving state; and
  if the input signal is received, keeping the electronic apparatus in the working state.

13. The method for automatically switching power states according to claim 7, wherein the assigned function is a video-recording function.

14. The method for automatically switching power states according to claim 7, wherein the first power-saving state is one of a hibernate state and a soft off state, and the second power-saving state is a standby state.

* * * * *